Jan. 16, 1951 T. J. BUZALSKI 2,538,503

TELEVISION SIGNAL MONITORING EQUIPMENT

Filed May 31, 1946

INVENTOR
Thomas J. Buzalski
BY
H. S. Grover.
ATTORNEY

Patented Jan. 16, 1951

2,538,503

UNITED STATES PATENT OFFICE 2,538,503

TELEVISION SIGNAL MONITORING EQUIPMENT

Thomas J. Buzalski, Cranford, N. J., assignor to Radio Corporation of America, a corporation of Delaware Application May 31, 1946, Serial No. 673,281

2 Claims. (Cl. 171—95)

The present invention relates to an improvement in monitoring equipment to be used at a television transmitter whereby it is possible to ascertain the degree or percentage of modulation of a radio frequency carrier when modulated by a television video signal waveform.

According to the present standards of television transmission, the synchronizing impulses (which extend in a blacker than black direction) are transmitted at maximum carrier level which, for convenience, will be designated as 100% carrier. Full black in the picture or image and all blanking impulses are transmitted at 75% of full carrier (within ±2½%) and full white in the picture or image is generally transmitted at approximately 15% of maximum carrier amplitude. In order that these prescribed percentages of carrier modulation or amplitude may be assured, some means for indicating the percentage of modulation, or, more properly, the instantaneous amplitude of the radio frequency carrier, must be provided.

In a television transmitter, the radio frequency energy or power available from the final output stage is, as stated above, a function of the particular information being transmitted at any particular instant, and the carrier is accompanied by both side bands extending on each side of the mean carrier. This double side band signal is then applied to the vestigial side band suppressor where a substantial portion of one side band (generally the lower) is suppressed in accordance with the prescribed standards. The unsuppressed portion of the radio frequency energy is applied to the radio antenna for transmission.

In the past, the percentage of modulation or the carrier amplitude has been indicated in some instances by applying signals available from the output stage of the transmitter to the vertical deflecting plate of a cathode ray tube in an oscilloscope for deflecting a cathode ray beam in a vertical direction in proportion to the intensity of the carrier while the cathode ray beam is deflected horizontally in a linear manner with respect to time and synchronized with the line or field repetition rate of the video signals. When the cathode ray beam in the oscilloscope is so deflected, the complete carrier amplitude envelope is represented and the vertical deflection of the cathode ray beam is at maximum during synchronizing intervals. Correspondingly, the vertical deflection of the cathode ray beam is at minimum during the transmission of signals representative of white in the picture or image. By applying calibrations to the screen of the cathode ray tube, it was then possible to indicate the carrier amplitude at the time of transmission of signals representative of white, black and synchronizing impulses. Such a system is satisfactory if sufficient power is available and if the radio frequency voltage available from the final output stage is sufficient to directly produce the desired vertical deflections of the cathode ray beam. In transmitters where an insufficient amount of radio frequency potential is available, some form of amplification must be provided between the source and the vertical deflection plates of the cathode ray tube in the oscilloscope. When an amplifier is required, this method of indicating carrier level is not entirely satisfactory since it is difficult to reliably maintain uniform and consistent operation in such amplifiers.

In order to avoid the necessity of providing an amplifier which is capable of amplifying the radio frequency carrier, provision has been made for rectifying the radio frequency carrier in order to provide a video signal having an intensity proportional to the instantaneous radio frequency carrier envelope. The video signal may then be applied to the vertical deflecting plates of the cathode ray oscilloscope tube and the amplifier associated with the oscilloscope need only have a characteristic sufficient to amplify the video signal applied thereto. There is then presented on the screen of the oscilloscope tube a trace corresponding to half the envelope of the radio frequency energy available from the output stage of the transmitter. This method of monitoring, although more desirable than the radio frequency method, has the objection that no indication is given on the screen of the cathode ray oscilloscope which corresponds to zero intensity of the radio frequency carrier envelope. It is, therefore, difficult to ascertain when a transmission level of 15% prevails for signals representative of white in the image and, furthermore, since no zero intensity base line is provided, the other carrier amplitude indications are not definitely assured, so that there is always some doubt as to the accuracy of the indication given by the monitoring oscilloscope.

In the present invention, provision is made whereby a zero base line is automatically provided on the viewing screen of the monitoring oscilloscope so that with this base line provided, the accuracy of the other calibration may be assured and a proper and accurate indication of the carrier level may be conveniently presented at all times, or at such times as an indication of zero carrier envelope is desired.

Since, in the transmission of television image signals, the radio frequency carrier is rarely ever reduced to zero amplitude, the present invention provides a means whereby the intensity of the video signals applied to the monitoring oscilloscope will momentarily and artificially be brought to a zero level for predetermined intervals so that an indication will be presented on the viewing screen of a cathode ray tube which corresponds to zero voltage level of the video signal and likewise zero level of the radio frequency carrier.

One of the purposes of the present invention, therefore, resides in the provision of means in a television transmitter whereby the amplitude of the radio frequency carrier, especially for various portions of the video signal, may be indicated at all times on the screen of a monitoring oscilloscope.

Another purpose of the present invention resides in the provision of means whereby there is produced on the screen of the monitoring oscilloscope a definite and accurate indication or marking corresponding to zero amplitude of the radio frequency carrier envelope.

Still another purpose of the present invention resides in the provision of an accurate zero base line on the screen of a monitoring oscilloscope so that the vertical deflections of the cathode ray beam in the oscilloscope may be properly calibrated to indicate the actual carrier level for portions of the video signal representing, for example, white, black and synchronizing impulses.

Still another purpose of the present invention resides in the provision of means in a television transmitter whereby the video potentials applied to a monitoring oscilloscope, which are proportional to the instantaneous radio frequency carrier envelope amplitude, may be momentarily brought to a zero level in order that an indication corresponding to zero carrier envelope may be presented on the screen of a monitoring oscilloscope.

Still other purposes and advantages of the present invention will become more apparent to those skilled in the art from the following detailed descriptions particularly when considered in connection with the drawings, wherein.

Figure 1:
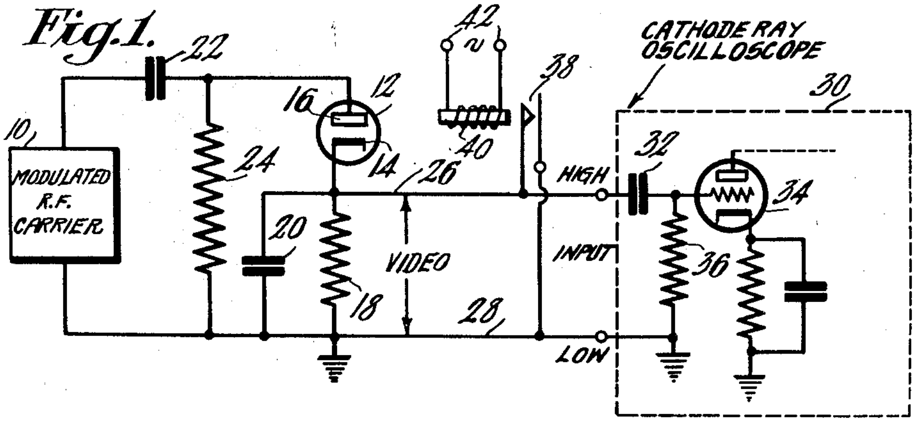
Figure 1 represents schematically a preferred form of the present invention.

Referring now to the drawings and more particularly to Figure 1 thereof, there is represented by the rectangle 10 a source of television video signal modulated radio frequency carrier energy, generally available from the final output stage of the television transmitter. The radio frequency signals available from this source include the entire modulation envelope with both side bands. A rectifier tube or demodulator 12 is provided which includes a cathode 14 and an anode 16. The cathode 14 is connected to ground or a point of fixed potential by means of a load impedance 18 which is by-passed by a condenser 20. The condenser 20 is radio frequency by-passed condenser and is sufficiently small as to have no effect on the produced video signal spectrum. The radio frequency signals are applied to the anode of the demodulator 12 by means of coupling condenser 22, and a resistance 24, generally of a high value, is connected between the anode 16 and the point of fixed potential.

When radio frequency signals are applied to the demodulator 12 there is then present across the resistance 18 a voltage directly proportional to the instantaneous amplitude of the applied radio frequency carrier envelope. This voltage variation will be referred to as the video signal and it is this voltage that is applied to the monitoring oscilloscope.

A pair of conductors 26 and 28 are connected to opposite ends of the load resistor 18. These conductors in turn are connected to the high and low input terminals of the monitoring oscilloscope represented in general by the dotted rectangle 30. Inside the oscilloscope is generally included a coupling condenser 32 and an amplifier, of which the first stage is represented by the tube 34. A grid resistance 36 is connected between the control electrode of tube 34 and ground potential. The remainder of the amplifier that is contained within the oscilloscope is not shown but obviously the amplifier should preferably have a characteristic sufficient to pass the entire frequency spectrum of the applied video signals. The output from the amplifier is then applied to the vertical deflection plates of the monitoring oscilloscope cathode ray tube.

The circuit arrangement also includes a switch 38, the terminals of which are connected to the conductors 26 and 28. This switch is preferably electromagnetically operated by means of the magnet 40 which is energized by applying a voltage variation to the terminals 42 of the electromagnet. When the electromagnet is intermittently energized (by pulsating or alternating current) the contacts 38 are intermittently closed to short circuit conductors 26 and 28, thereby to reduce the potential difference between these conductors to zero. As soon as the contacts 38 are separated, the potential difference between conductors 26 and 28 immediately assumes a value corresponding to the then instantaneous magnitude of the radio frequency carrier envelope.

The horizontal deflection rate of the cathode ray beam in the monitoring oscilloscope is generally adjusted to operate in synchronism with the field repetition rate or the line repetition rate. According to present black and white transmission standards, the frame repetition rate is 60 cycles per second whereas the line repetition rate is of the order of 15,750 cycles per second. If it is desired to observe the video signal waveform for a field cycle, the oscilloscope horizontal deflection is generally adjusted to 30 cycles per second so that two complete television fields or one frame (neglecting the oscilloscope beam return time) are present on the screen of the oscilloscope. If it is desired to observe the waveform of the line structure, then the horizontal deflection of the oscilloscope is normally set to one half the line repetition rate so that video signals representing two lines (neglecting the oscilloscope beam return time) are presented on the viewing screen of the oscilloscope.

Figure 2:
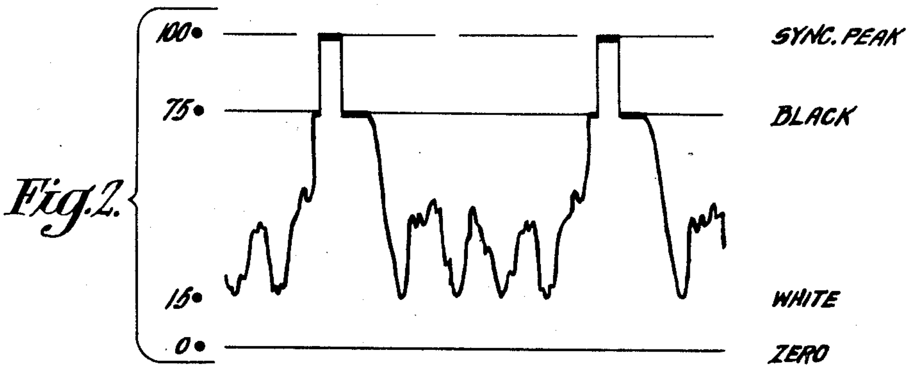
Figure 2 represents one form of a trace observable on the monitoring oscilloscope.
Figure 3:
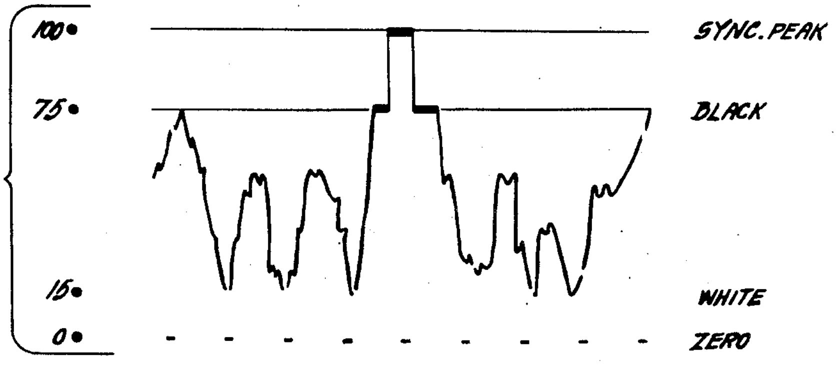
Figure 3 represents another form of a trace observable on the screen of the monitoring oscilloscope.

If the contacts 38 were omitted, and the signals available at conductors 26 and 28 were continuously applied to the monitoring oscilloscope, then a representation would be present on the screen of the oscilloscope similar to that shown in Figures 2 and 3 with the exception that the zero base line (solid in Figure 2 and dotted in Figure 3) would not be portrayed. Figure 2 represents, for example, in simplfied form, the trace on the screen of the monitoring oscilloscope when the horizontal deflection of the oscilloscope is set at one half the line repetition frequency. Almost two complete lines are, therefore, represented on the screen of the cathode ray tube and the configuration of the blanking and synchronizing impulses is clearly shown. The signals representing the picture image content are shown by the irregular line intermediate the synchronizing impulses. Inasmuch as the monitoring oscilloscope continues to operate even during the television vertical return time (vertical blanking) and the vertical synchronizing interval, two horizontal lines are also observable on the screen of the monitoring oscilloscope, the one opposite the 75% carrier designation corresponding to vertical blanking whereas the broken line opposite the 100% carrier designation corresponds to the vertical synchronizing impulse, the breaks in the lines being in fact the double line frequency slots (slotted vertical sync impulse) as required by present standards to assure continued synchronous operation of the line deflection generator of the television receiver and to insure proper interlacing.

In Figure 3, substantially two fields are presented since the horizontal deflection of the cathode ray beam in the monitoring oscilloscope is set at 30 cycles per second or one half the field repetition rate. The two horizontal lines, at black level or 75% carrier and at sync peak or 100% carrier, represent, respectively, blanking and synchronizing impulses for the individual line elements occurring within each field cycle. Since the resolution of a normal oscilloscope operating at 30 cycles per second is insufficient to separate the individual line sync impulses, they appear as a continuous line. In actuality, they are dots since their duration is very short as compared with one field cycle and the signals corresponding to the image are interspersed between the individual line synchronizing impulses, as is well known to those skilled in the art. As explained above, with such a configuration on the screen of the monitoring oscilloscope, there is no true indication as to what portion of the screen would represent zero intensity of the radio frequency signal, and accordingly the other calibrations become uncertain.

The contacts 38, and the electromagnet for operating the contacts, are preferably operated at a frequency of the order of 800 to 1,000 cycles per second and the switching rate should preferably be nearly, but not exactly, in synchronism with the signal being observed. During the time when the contacts 38 are closed, the input level of the signal to the oscilloscope is brought to zero with the result that a positive indication is presented on the viewing screen of the oscilloscope corresponding to zero carrier level, which of course is in the direction of whiter than white. The short circuiting interval of the contacts 38 should be short (perhaps of the order of 10%, or less, of a switching cycle) but long enough so that there can be no doubt that the circuit has been fully discharged and long enough so that a positive mark is evident on the viewing screen of the oscilloscope corresponding to zero carrier level. The cathode ray oscilloscope amplifier must be linear over a sufficiently wide band to pass the composite signal without distortion.

If the vertical deflection circuit or amplifier of the monitoring oscilloscope operates with the direct current component of the signal reinserted, it is then possible to calibrate the viewing screen of the oscilloscope to show directly the percentages of modulation or relative amplitudes of the carrier with the synchronizing signals at 100% amplitude and with the position of the beam at zero amplitude calibration for zero input level as, for example, when the contacts 38 are closed. When the monitoring oscilloscope is set to operate at 30 cycles per second horizontal deflection, as in Figure 3, the individual intervals when the contacts 38 are closed are discernible and appear as a series of dots opposite the zero level calibration. Similarly, a slight break will appear in the oscillograph trace directly above each individual zero level reference dot. If the operating frequency of the contacts 38 is set at slightly above or below 900 cycles per second, then slightly more or less than 30 dots (excluding oscilloscope beam fly-back time) will appear on the screen of the oscilloscope. If a frequency near 900 is chosen, then the dots will appear to progress or retrogress across the screen. The resultant row of slowly moving dots is more advantageous than a stationary row of dots since if the dots are permitted to move slowly, the zero base line is still observable yet there is no possibility of any particularly white portion of the picture signal series being repeated and consistently shorted out by the contacts 38. In other words, no single bit of information is continuously obliterated as would be the case if the contacts were operated at some even multiple of the oscilloscope horizontal deflection rate.

When the oscilloscope horizontal deflection is set at one half the line repetition rate, then the duration of the short across conductors 26 and 28 becomes long as compared with the oscilloscope deflection time, with the result that each individual dot of Figure 3 is presented as a continuous line at the zero carrier level as in Figure 2.

During the development of the present invention, various types of devices were used to operate the shorting switch 38, these including a motor driven segmented disc, a motor driven cam and a loud speaker element provided with contacts, but the most satisfactory mechanism for operating the switch was the magnetic structure from a magnetic type head set. An especially constructed armature was associated with the magnetic structure, the armature being supported at each end. The electromagnetic coils of such a switch were then energized by an alternating current signal of appropriate frequency and waveform to produce the desired short circuiting rate and duration. With the latter arrangement, a clean make and break of the contact was provided and by proper adjustment, the ratio of the open period to the closed period could be adjusted to obtain the desired effect.

With the present invention, it is, therefore possible to apply calibrations to the viewing screen end of the oscilloscope tube corresponding to the critical or important signal level indications, namely, zero, 15, 75 and 100 per cent maximum carrier level. With these calibrations applied to the end of the tube, and with the direct current inserter in the oscilloscope responding to the sync peaks, when the signal is applied to the oscilloscope the synchronizing signals will correspond to the 100% carrier envelope amplitude. The oscilloscope gain is then so adjusted that the base line (or dots) inserted by the switch is caused to fall opposite the zero carrier envelope calibration. A reliable indication is then presented on the screen of the monitoring oscilloscope as to the relative intensity of the carrier for signals representative of both white and black in the picture or image. With the present invention, it is, therefore, possible to obtain an accurate and continuous indication of the carrier envelope amplitude for the various signal levels of the video signals series in order that the signal may be transmitted as required by the prescribed standards.

Having now described the invention, what is claimed and desired to be secured by Letters Patent is the following:

1. A monitoring system for a television transmitter for observing the absolute amplitude of a modulated radio frequency carrier in which the carrier is amplitude modulated by video and sync signals and in which the minimum carrier amplitude level is variable but not normally reduced to zero, comprising a diode including an anode and a cathode connecting in series with a load impedance, means to apply the modulated carrier to the series connected diode and load impedance to produce a potential variation across the load impedance corresponding to the instantaneous amplitude of the radio frequency carrier envelope, means adapted to apply the produced potential variation to the vertical deflection input terminals of a monitoring oscilloscope to produce a nominally stationary trace, a switching device including a pair of electrodes connected to opposite ends of the load impedance, means for operating the switching device so that the load impedance is intermittently shorted for predetermined cyclically recurring relatively short time intervals to reduce the intensity of the produced potential variation to zero during these intervals so that an indication will be intermittently presented on the viewing screen of the monitoring oscilloscope corresponding to zero amplitude of the radio frequency carrier to permit observing the absolute amplitude of certain portions of the amplitude modulated radio frequency carrier relative to its zero level.

2. A monitoring system for a television transmitter as defined in claim 1 wherein the frequency at which the load impedance is intermittently shorted corresponds nearly to the repetition rate of the sync impulses whereby the intermittent indication corresponding to zero amplitude of the radio frequency carrier envelope will be continuously shifted in time with respect to the nominally stationary waveform of the produced voltage variations.

THOMAS J. BUZALSKI.

REFERENCES CITED

The following references are of record in the file of this patent:

UNITED STATES PATENTS

| Number | Name | Date |
|---|---|---|
| 2,073,370 | Goldsmith et al. | Mar. 9, 1937 |
| 2,089,430 | Roys | Aug. 10, 1937 |
| 2,122,499 | Stocker | July 5, 1938 |
| 2,178,074 | Jakel et al. | Oct. 31, 1939 |
| 2,284,219 | Loughren | May 26, 1942 |
| 2,293,135 | Hallmark | Aug. 18, 1942 |